United States Patent [19]

Mishiro

[11] Patent Number: 4,764,702
[45] Date of Patent: Aug. 16, 1988

[54] ULTRASONIC MOTOR DEVICE
[75] Inventor: Shoiji Mishiro, Kanagawa, Japan
[73] Assignee: Taga Electric Co., Ltd., Tokyo, Japan
[21] Appl. No.: 21,544
[22] Filed: Mar. 2, 1987

Related U.S. Application Data

[63] Continuation of Ser. No. 814,927, Dec. 30, 1985, abandoned.

[51] Int. Cl.⁴ .............................................. H01L 41/08
[52] U.S. Cl. ..................................... 310/323; 310/328
[58] Field of Search ................ 310/321, 323, 328, 317

[56] References Cited

U.S. PATENT DOCUMENTS 4,210,837 7/1980 Vasiliev et al. ................ 310/333 X
4,562,373 12/1985 Tokusima et al. .............. 310/323 X

FOREIGN PATENT DOCUMENTS 0843032 6/1981 U.S.S.R. .............................. 310/317

Primary Examiner—Patrick R. Salce
Assistant Examiner—Emanuel Todd Voeltz
Attorney, Agent, or Firm—Oblon, Fisher, Spivak, McClelland & Maier

[57] ABSTRACT

An ultrasonic motor having a torsional vibrator a diametrically or longitudinal disk resonator. A diametrically or longitudinal resonator is located at the node of the vibratory member and at right angles thereto. A rotor is disposed opposite to the output of the vibratory member.

6 Claims, 4 Drawing Sheets

FIG. I
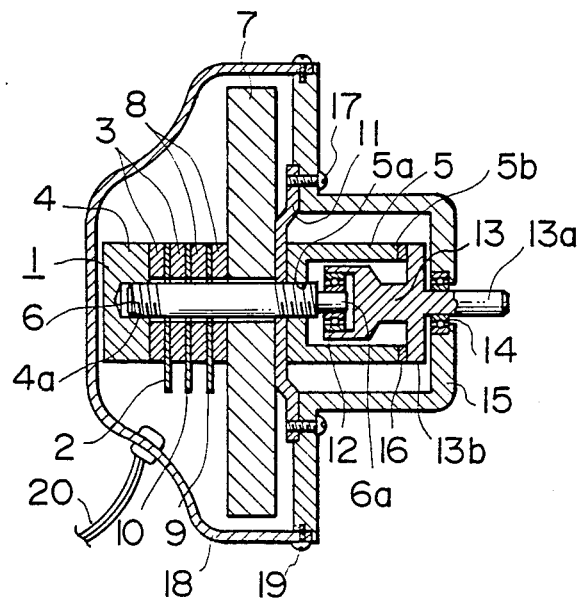
FIG. 2
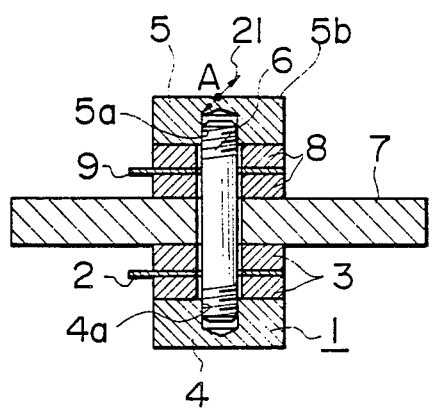

FIG. 5
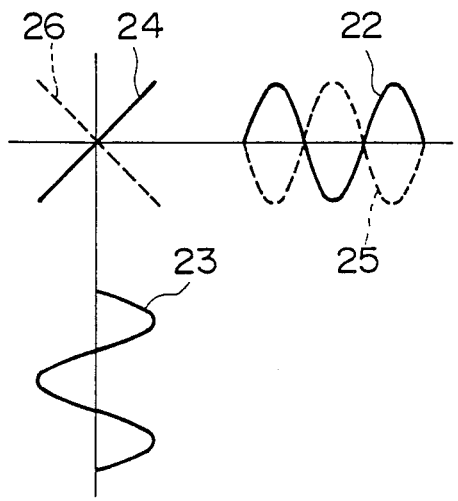
FIG.6(A) FIG.6(B) FIG.6(C)
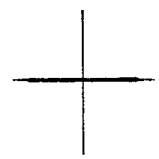 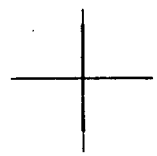 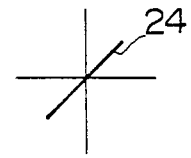
FIG.6(D) FIG.6(E) FIG.6(F)
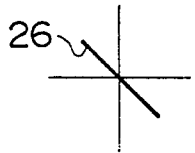 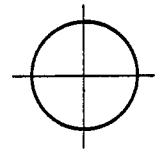 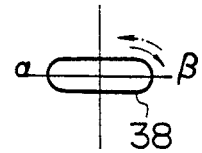
FIG.6(G) FIG.6(H) FIG.6(I)
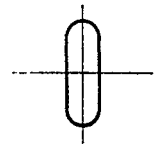 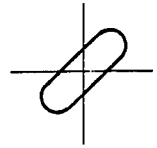 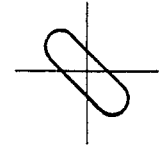

ULTRASONIC MOTOR DEVICE

This application is a continuation of application Ser. No. 814,927, filed on Dec. 30, 1985, now abandoned.

FIELD OF THE INVENTION AND RELATED ART STATEMENT

The present invention relates to an ultrasonic motor device of a type that rotates a rotor by utilizing ultrasonic vibration.

It has been known heretofore that the motor using ultrasonic vibration as driving force is advantageous in comparison with a conventional type designed to drive its rotor by electromagnetic force, since some component members are dispensable including magnets, silicon steel plates and so forth of magnetic material as well as coils and therefore a compact, lightweight structure is achievable with another merit of low production cost.

Prior exemplary means for implementing such motor are disclosed in Japanese Patent Laid-open Nos. 55-125052 and 56-138469, wherein a vertical vibrator and a rotor are disposed opposite to each other, and a plate-shaped vibratory portion is formed at an end face of one of them integrally therewith in such a manner as to retain a predetermined angle of inclination with respect to the axis of rotation, and elliptic vibration of such vibratory portion caused by the reciprocation of the vibrator is converted into a rotary motion of the rotor. However, in the above system where the elliptic vibration of the vibratory portion at the fore end thereof is effected merely in a single direction determined by the mechanism, the rotation is not reversible unless a proper switching operation is performed by means of a lever or the like. In addition, the ellipticity of such vibration is not variable under control, so that it is difficult to attain satisfactory rotation in an efficient contact state with further disadvantages of considerable noise and abrasion induced in contact regions.

According to another means disclosed in Japanese Patent Laid-open No. 58-148682, traveling waves are generated in the surface of an elastic member, and the traveling-wave energy derived from the elliptic vibration thereof is converted into a rotary or linear motion through contact with a moving member under pressure. In this system, the direction of motion (rotation) of the moving member is reversible by controlling the phase of a voltage applied to a driving element. However, there still exists a problem that the operation is limited merely to a relatively low speed range and the electromechanical conversion efficiency is low.

OBJECT AND SUMMARY OF THE INVENTION

It is an object of the present invention to provide an ultrasonic motor device which is drivable at an optimal high transmission efficiency in accordance with its speed, rotational direction and load condition while minimizing noise and abrasion.

In the present invention, elliptic or circular vibration is generated at the output end of a vibratory member in the form of composite vibration of a torsional vibrator and a diametrical or longitudinal resonator disposed orthogonally to the axis of the vibrator, and a rotor disposed opposite to such output end is rotated through a combination of the contact therewith and the composite vibration. The invention is so contrived that the rotational direction and rate of the rotor can be controlled with facility in accordance with load condition and so forth by changing the ellipticity, directivity or angle of the elliptic vibration through alteration of the vibration amplitude or relative phase.

BRIEF DESCRIPTION OF THE DRAWINGS

FIG. 1 is a vertical sectional front view schematically showing the assembly of the present invention;

FIG. 2 is a vertical sectional front view showing the basic structure of the invention;

FIG. 5 graphically shows how composite vibration is produced;

FIG. 6(*a*) through (*i*) illustrate various vibration postures;

DETAILED DESCRIPTION OF PREFERRED EMBODIMENTS

Figure 3:
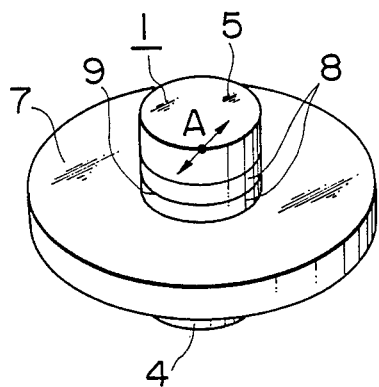
FIG. 3 is a perspective view of FIG. 2.

Hereinafter an exemplary embodiment of the present invention will be described with reference to the accompanying drawings. In FIG. 1 showing the structure of an ultrasonic motor, a torsional vibrator 1 serves as a basic component to generate torsional vibration. The torsional vibrator 1 is so constituted that electrostrictive elements 3 each functioning as a driving element for generation of torsional vibration are attached to both surfaces of a driving electrode plate 2, and a vibratory member 4 and a bottomed cylindrical vibratory member 5 having screw holes 4a and 5a respectively on the axes thereof are clamped together by means of a center bolt 6. In this embodiment, a disk resonator 7 capable of resonating diametrically and an electrostrictive element 8 for driving the resonator 7 are interposed between the electrostrictive element 3 and the vibratory member 5, and the entire components are clamped together integrally by the aforesaid center bolt 6. An electrode plate 9 is interposed between the two electrostrictive elements 8, and another electrode plate 10 is interposed between the electrostrictive elements 3 and 8. Furthermore, a casing anchor member 11 is provided between the vibratory member 5 and the disk resonator 7.

A small-diameter stepped portion 6a is formed at one end of the center bolt 6, and a bearing 12 is fitted to the periphery of the stepped portion 6a. Meanwhile a spot facing portion at one end of a rotor 13 disposed coaxially with the center bolt 6 is fitted to the periphery of the bearing 12, and a shaft 13a at the other end of the rotor 13 is fitted to a casing 15 through a bearing 14 so as to support the rotor 13 rotatably. The rotor 13 has a large-diameter portion 13b opposed to an output end 5b of the vibratory member 5 and is kept in pressed contact therewith through a pressure contact member 16 composed of low-wear high-friction rubber or the like. The casing 15 is secured to the casing anchor member 11 by a screw 17, and a cover 18 is attached to the casing 15 by a screw 19. And a power cord 20 for feeding power to the aforesaid electrode plates 2, 9, 10 and a common terminal (not shown) of the vibratory members is lead out from the cover 18.

In this arrangement, the disk resonator 7 driven to produce diametrical resonant vibration by the electrostrictive element 8 is located at the nodal portion of the torsional vibrator 1 and is set orthogonally to the axis thereof. And the entire structure is so constituted that coincidence is attained between the resonance frequency of the disk resonator 7 driven by the electrostrictive element 8 and the torsional vibration resonance frequency determined by the axial length of an assembly consisting of the vibratory member 4, electrostrictive elements 3 and 8, disk resonator 7, casing anchor member 11 and vibratory member 5.

Figure 4:
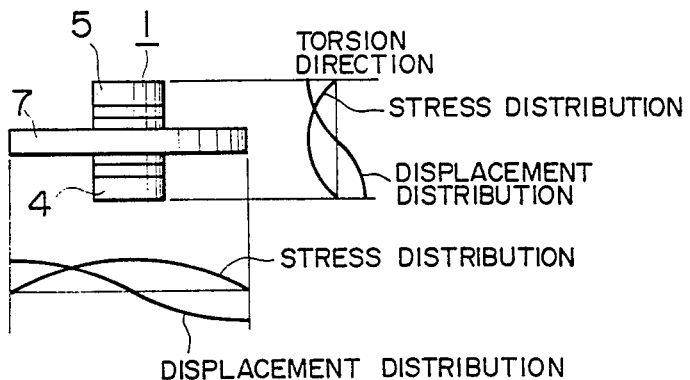
FIG. 4 shows a displacement distribution and a stress distribution.

Now the principle of operation and the control in such structure will be described with reference to FIGS. 2 through 7. The basic construction of the torsional vibrator 1 including the disk resonator 7 and so forth of FIG. 1 can be equivalently shown as FIGS. 2 and 3. Supposing now that the electrode plate 9 is connected to a driving power supply and its frequency is coincident with the diametrical resonance frequency of the disk resonator 7, then the disk resonator 7 is driven to produce resonant vibration. With regard to the displacement distribution and the stress distribution obtained in such a case, as shown in FIG. 4, the amplitude is maximum at the circumference of the disk resonator 7 while the stress is maximum on the axis thereof. Consequently, axial vibration is also generated due to the Poisson phenomenon, and the axial maximum amplitude is induced at the two end faces of the vibratory members 4 and 5. The essential point to be noted here is that such axial vibration is generated not by the axial vertical resonant vibration but by the diametrical resonant vibration of the disk resonator 7.

When the electrode plate 2 is connected in parallel to the aforesaid driving power supply and the torsional vibrator 1 is driven by the electrostrictive element 3 in a state where the diametrical resonance frequency is equal to the torsional vibration resonance frequency, then the torsional vibrator 1 produces resonant vibration in the direction of an arrow 21 in FIG. 2. Since the torsional vibration is combined with the aforementioned axial vibration at a point on the circumferences of the end faces of the vibratory members 4 and 5, e.g. at a point A on the output end 5b.

As graphically shown in FIG. 5 where a curve 22 represents the amplitude and phase of the axial vibration and a curve 23 represents those of the vibration in the torsion direction, the composite vibration posture becomes oblique as represented by a curve 24 (under the condition that the amplitudes and phases of the curves 22 and 23 are equal to each other). If the relative phase of the axial vibration is inverted 180° as shown by a dotted curve 25, the composite vibration posture is inverted symmetrically with respect to the axis as shown by a dotted curve 26. Furthermore the inclination angle of such composite vibration can be changed by altering the relative amplitude of the two vibrations. In addition, it is also possible to modify the composite vibration posture as desired to a circle, ellipse, inclined ellipse or the like under control as well as the rotational direction and displacement by altering the relative amplitude and phase.

FIG. 6 shows typical composite vibration postures (loci) obtained at the point A in case either or both of such relative amplitude and phase are altered. The examples are a horizontal vibration (a) generated by reducing the amplitude of the curve 22 to zero; a vertical vibration (b) generated by reducing the amplitude of the curve 23 to zero; oblique vibrations (c) and (d) shown in FIG. 5; a circular vibration (e) generated by shifting the relative phase of the curves 22 and 23 by 90° with the amplitudes equalized to each other; a horizontal elliptic vibration (f); a vertical elliptic vibration (g); and oblique elliptic vibrations (h) and (i) generated by adequately changing the amplitudes and relative phase of the curves 22 and 23.

Figure 7:
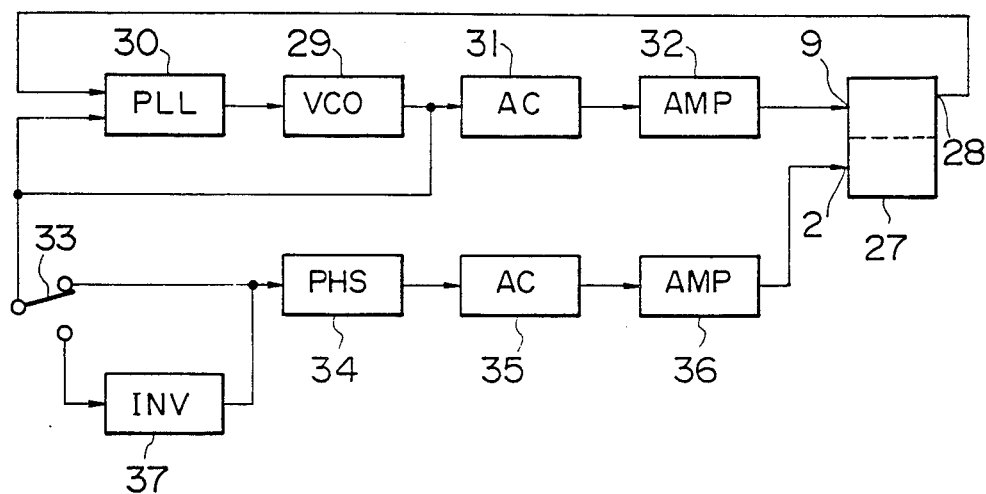
FIG. 7 is a block diagram.

FIG. 7 is a block diagram of a control system for a driving power unit to perform the above-described various control operations. A vibrator 27 shown in a simplified form has the same structure as that of FIG. 2, where a terminal (electrode plate) 9 is driven in the diametrical direction of a disk resonator 7, and a vibration speed signal 28 produced therefrom is fed to a phase-locked loop 30 which functions to maintain the output phase of a voltage-controlled oscillator 29 with a predetermined phase difference to the signal 28, so that the oscillator 29 is caused to follow up the resonance frequency of the diametrical vibration. The output of the voltage-controlled oscillator 29 is fed to an amplitude control circuit 31 so as to be controlled to a required amplitude and then is fed to an amplifier 32, whereby diametrical resonant vibration of a given amplitude is generated axially at the point A, for example. Meanwhile the output of the voltage-controlled oscillator 29 is partially inputted via a changeover switch 33 to a phase control circuit 34, which controls the phase within ±180° and subsequently its output is fed to an amplitude control circuit 35. The vibration controlled to have a required amplitude is further processed in an amplifier 36, so that the torsional vibration is imparted to the terminal (electrode plate) 2. And the phase of the torsion direction signal is inverted by selectively operating a phase inverter 37 via the changeover switch 33.

Consequently, in the vibrator 27 thus driven at the same resonance frequency in both torsion and diametrical directions, the outputs of the vibratory members 4 and 5 are combined with each other to produce composite vibration in any of the various postures shown in FIG. 6 through the amplitude control circuits 31 and 35, the phase control circuit 34 and the phase inverter 37, whereby the inclination angle and ellipticity of such composite vibration as well as the rotational direction and size of the circle or ellipse can be controlled as desired.

Now referring back to the ultrasonic motor of FIG. 1 again, composite vibration can be obtained in any of various postures from the output end 5b of the vibratory member 5 by mutually combining the axial vibration and the torsional vibration. In this example, the rotor 13 is rotated by utilizing the elliptic vibration (including circular vibration) shown in FIG. 6(e) through (i). Supposing now the horizontal elliptic vibration (curve 38) of FIG. 6(f) is generated at the output end 5b of the vibratory member 5 (in the rotational direction indicated by a solid-line arrow), then it follows that in a vibration stroke α→β the output end 5b of the vibratory member 5 comes to vibrate circumferentially while extending with a displacement toward the opposed portion 13b of the rotor 13 via the pressure contact member 16, whereby such vibration is frictionally imparted to the rotor 13 to rotate the same. Meanwhile in a vibration stroke β→α, the output end 5b vibrates in the circumferential direction with axial contraction thereof, hence exerting no effect on the rotor 13. Accordingly the rotor 13 is rotated unidirectionally by a combination of the vibration in its stroke α→β and the frictional contact. When the rotational direction of the curve 38 is reversed under phase control, then the rotor 13 is rotated also in the reverse direction. Therefore the rotational direction of the elliptic vibration can be reversed by inverting the relative phase of the curves 22 and 23 as mentioned previously, hence enabling the reverse rotation of the rotor 13. Moreover, the rotational rate of the rotor 13 is changeable by controlling the driving amplitude in the torsion direction. In addition to the above, the output torque is obtainable in the optimal contact state with regard to a wide range of rotation by controlling the ellipticity or inclination in accordance with each load torque condition. Furthermore, noise and abrasion are reducible due to the structural advantage that the entire surface of the output end 5b of the vibratory member 5 is kept in complete contact with the opposed portion 13b of the rotor 13.

In a modification, a pressure regulator may be provided in series with the pressure contact member 16.

Figure 8:
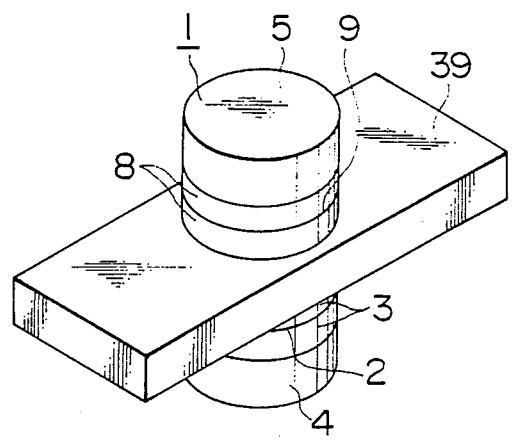
FIG. 8 is a perspective view of a modified resonator.

Although in the foregoing embodiment the disk resonator 7 is combined with the torsional vibrator 1, a rectangular resonator 39 may be employed instead and driven by the electrostrictive element 8 to produce longitudinal resonant vibration, as shown in FIG. 8. When such rectangular resonator 39 is driven at its longitudinal vibration frequency, the displacement distribution and the stress distribution become such that, similarly to the foregoing case of using the disk resonator 7, the maximum amplitude is obtained at the end of the rectangular resonator 39 and the maximum stress on the axis thereof. Consequently, due to the Poisson phenomenon, axial vibration is also generated to induce the maximum amplitude at the two ends of the vibratory members 4 and 5 in the axial direction as well. Therefore, if the torsional vibrator 1 is driven by the electrostrictive element 3 at the torsional vibration resonance frequency equal to the longitudinal resonance frequency, a composite vibration posture of the axial vibration and the torsional vibration is obtained at the output ends of the vibratory members 4 and 5, whereby elliptic vibration is produced.

According to the present invention, as mentioned hereinabove, a diametrical or longitudinal resonator is set in a nodal portion of a torsional vibrator orthogonally to the axis thereof and integrally therewith while the respective resonance frequencies are equalized to each other, and a rotor disposed opposite to the output end of a vibratory member is kept in pressed contact therewith, so that the rotor is rotatable by a combination of the composite elliptic vibration generated at the output end and the friction therewith. And the inclination, ellipticity, rotational direction and extent of such elliptic vibration are changeable as desired by altering the amplitude or relative phase under electric control. Consequently, it becomes possible to control the forward and reverse rotation of the rotor as well as the rotational rate thereof in a wide range at the maximum conversion efficiency with another structural advantage of reducing both noise and abrasion.

I claim:

1. An ultrasonic motor comprising:
   a vibrator comprising a torsional vibration member provided with an electrostrictive element for exciting a torsional vibration of said vibrator, a diametrical or longitudinal resonator located at a node portion of said torsional vibration member at right angles to an axis and having a resonance frequency identical with a torsional resonance frequency of said vibrator, and a second electrostrictive element for exciting a longitudinal vibration of said diametrical or longitudinal resonator;
   a rotor arranged in press contact opposite to an output end of said vibrator;
   first driving means coupled to said first electrostrictive element for producing a vibration therein;
   second driving means coupled to said second electrostrictive element for producing a vibration therein; and
   wherein said first and second driving means generate torsional and longitudinal vibrations, respectively.

2. The ultrasonic motor as defined in claim 1, wherein said torsional vibration member, said diametrical or longitudinal resonator and said electrostrictive element for driving said torsional vibration member and said second electrostrictive element for driving said diametrical or longitudinal resonator are assembled as a unit by a center bolt.

3. The ultrasonic motor as defined in claim 1, wherein said torsional vibration member, said diametrical or longitudinal resonator and said electrostrictive element for driving said torsional vibration member and said second electrostrictive element for driving said diametrical or longitudinal resonator are arranged coaxially with said rotor.

4. The ultrasonic motor device as defined in claim 1, wherein said diametrical resonator is composed of a disk.

5. The ultrasonic motor device as defined in claim 1, wherein said diametrical resonator is composed of a rectangular plate.

6. The ultrasonic motor device as defined in claim 1, wherein the rotational direction or rate of said rotor is changed by controlling the individual amplitudes or the relative phase of the torsional vibration and the diametrical or longitudinal vibration.

* * * * *